US006853313B2

(12) United States Patent
Newcomer (10) Patent No.: US 6,853,313 B2
(45) Date of Patent: Feb. 8, 2005

(54) VEHICLE POSITIONING DEVICE

(76) Inventor: Ronald E. Newcomer, 6417 Fairway Dr. West, Fayetteville, PA (US) 17222

( * ) Notice: Subject to any disclaimer, the term of this patent is extended or adjusted under 35 U.S.C. 154(b) by 78 days.

(21) Appl. No.: 10/320,431

(22) Filed: Dec. 17, 2002

(65) Prior Publication Data

US 2004/0113815 A1 Jun. 17, 2004

(51) Int. Cl.$^7$ ............................................. G08G 1/14
(52) U.S. Cl. .................... 340/932.2; 340/555; 340/556; 340/557; 180/199; 250/491.1; 399/400
(58) Field of Search ............................. 340/932.2, 555, 340/556, 557, 958; 180/199; 250/491.1; 399/400; 116/28 R (56) References Cited

U.S. PATENT DOCUMENTS

| | | |
|---|---|---|
| 4,084,339 A | 4/1978 | Peltier et al. |
| 4,179,216 A | 12/1979 | Theurer et al. |
| 4,180,322 A | 12/1979 | Farcinade |
| 4,572,613 A | 2/1986 | Mori |
| 4,665,378 A | 5/1987 | Heckethorn |
| 4,677,753 A | 7/1987 | Loggers |
| 4,700,301 A | 10/1987 | Dyke |
| 4,773,018 A | 9/1988 | Lundstrom |
| 4,933,864 A | 6/1990 | Evans, Jr. et al. |
| 5,285,205 A | 2/1994 | White |
| 5,295,073 A | 3/1994 | Celette |
| 5,390,118 A | 2/1995 | Margolis et al. |
| 5,575,550 A | 11/1996 | Appeldorn et al. |
| 5,623,259 A | 4/1997 | Giangardella |
| 5,646,614 A | 7/1997 | Abersfelder et al. |
| 5,691,725 A | * 11/1997 | Tanaka ........................ 342/126 |
| 5,773,721 A | * 6/1998 | Bashyam ..................... 73/596 |
| 5,781,119 A | 7/1998 | Yamashita et al. |
| 6,002,346 A | 12/1999 | Bowden et al. |
| 6,040,787 A | 3/2000 | Durham |
| 6,138,062 A | 10/2000 | Usami |
| 6,140,941 A | 10/2000 | Dwyer et al. |

(List continued on next page.)

FOREIGN PATENT DOCUMENTS

| | | |
|---|---|---|
| JP | 62232008 | 10/1987 |
| JP | 2000265699 | 9/2000 |

OTHER PUBLICATIONS

Published U.S. patent application Ser. No. US 2002/0011938, Kreiger, Publsihed –Jan. 31, 2002 (filed May 10, 2001).
Internet document found at http://www.ezpark.net (at least as early as May 23, 2002).
Zircon New Release, Zircon Introduces Self–Leveling Auto R Spinning Laser (prior to Dec. 17, 2002).
US Published Patent Application No. 2004/0111901A1, (U.S. Appl. No. 10/320,476), Ronald E. Newcomer, filed Dec. 17, 2002, published Jun. 17, 2004.

*Primary Examiner*—Daniel Wu
*Assistant Examiner*—Samuel J. Walk
(74) *Attorney, Agent, or Firm*—Stevens, Davis, Miller & Mosher, LLP (57) ABSTRACT

A method and apparatus for guiding a vehicle into an optimal position within a parking space. A first linear ray of light is projected along the centerline of a parking space. A second linear ray of light is projected at an angle to and intersecting the first linear ray within the parking space. The first linear ray of light guides the driver while moving into and through the space when the driver aligns an indicator on the vehicle with the first linear ray of light. As the driver nears the optimal position, the second linear ray of light will move towards the indicator. When the indicator coincides with the intersection of the first and second linear rays of light, the vehicle is in the optimal position.

22 Claims, 7 Drawing Sheets

U.S. PATENT DOCUMENTS

| | | |
|---|---|---|
| 6,150,943 A | 11/2000 | Lehman et al. |
| 6,154,150 A | 11/2000 | Laubach |
| 6,163,745 A | 12/2000 | Purchase et al. |
| 6,184,800 B1 | 2/2001 | Lewis |
| 6,191,706 B1 | 2/2001 | Kositkun |
| 6,198,386 B1 | 3/2001 | White, II |
| 6,218,962 B1 | 4/2001 | Fiene |
| 6,222,459 B1 | 4/2001 | Ting |
| 6,486,798 B2 * | 11/2002 | Rast ............................ 340/961 |
| 6,502,319 B1 | 1/2003 | Goodrich et al. |
| 6,531,966 B2 * | 3/2003 | Krieger ................... 340/932.2 |
| 6,598,304 B2 | 7/2003 | Akers |
| 2002/0140576 A1 * | 10/2002 | Simon ..................... 340/932.2 |
| 2003/0160705 A1 * | 8/2003 | Guetz ...................... 340/932.2 |

* cited by examiner

VEHICLE POSITIONING DEVICE

BACKGROUND OF INVENTION

The field of invention is a parking guide for use in a garage or other similar structure to aid a driver of a vehicle to properly park the vehicle within a parking space.

With the size of the garage shrinking in relation with the increased size of vehicles and the placement of other objects in the garage, such as bicycles, tools, etc., the need to more precisely locate the vehicle in the garage becomes increasingly important. If the driver of the vehicle is not properly guided into the garage, the vehicle may strike other objects in the garage, may strike the walls of the garages, or may not be pulled far enough into the garage to shut the garage door.

Numerous devices and methods are known for aiding owners of vehicles to park cars in garages. A typical and inexpensive device to properly locate a vehicle in a garage is to hang a tennis ball from a string in a predetermined position from the ceiling. When the tennis ball touches the windshield as the driver pulls the vehicle into the garage, the driver is assured that the vehicle is far enough into the garage. Other methods include placing bumps on the garage floor. When the vehicle contacts certain of the bumps, the driver is notified that the vehicle is far enough into the garage. The disadvantage of each of these devices is that when the vehicle is not in the garage, the devices become obstacles within the garage for a person walking through it. The person must avoid the ball dangling from the ceiling or the person must avoid tripping over the bumps on the garage floor.

Other devices include a light source pointing down from the ceiling of the garage onto the vehicle. The light source projects a beam or dot which, when adjusted properly, shines on a specific portion of the windshield or dashboard of the vehicle when the vehicle is in the proper location within the garage. Such devices are shown in U.S. Pat. Nos. 6,191, 706B1 to Kositkum, 6,002,346 to Bowden et at., and U.S. Pat. No. 6,154,150 to Laubach. The disadvantage of these particular methods is that they do not aid the driver in reaching the proper location. They merely inform the driver when the proper location is reached. Additionally, when the driver had substantially pulled into the garage and notices that the light dot is laterally off by some amount, he must make last minute maneuvers in the garage to align the dot or repeat the entire parking process. Such actions either leave the vehicle parked crooked in the garage or waste time moving the vehicle backwards and forwards.

OBJECT AND SUMMARY OF INVENTION

It is therefore an object of this invention to overcome the disadvantages of the above noted devices and provide a parking guide which guides the driver into the proper location as soon as the vehicle nears the garage. It is still a further object to provide such a parking aid that does not hinder use of the garage when no vehicle is present.

These and other objects of the invention are accomplished with a simple light guide device having first light source which provides a guiding line (linear guide ray or line ray) for the vehicle to follow as it enters the garage and a second light source that informs the driver when the vehicle has reached the proper distance into the garage. The two light sources intersect to form a point. When the driver of the vehicle aligns the point on a predetermined indicator on the vehicle, the vehicle is in the proper location in the garage. The indicator is at a location on the vehicle predetermined by the driver during the set up the device, which can be a dot on the dashboard, windshield, or sticker placed on the vehicle, or any other item useable as a reference.

The device can be made of two separate units containing light sources or a single light source. The light sources may be lasers or other devices that emit sufficiently bright light and fine light paths. Each light source is rotated in a circular pattern to change the single ray into a line ray.

The first light line ray projects centered to the desired vehicle location. The ray appears along the driveway leading into the garage and to the back wall of the garage. As the driver approaches the garage, the line appears on the hood of the vehicle. The driver would then align the vehicle with the line ray centered on the hood or the predetermined indicator as the vehicle approaches the proper parking location. This guides the vehicle down the center, widthwise, of the parking spot.

The second line ray would project at an angle to the first ray, preferably at 90°. As the driver guides the vehicle towards the parking position following the first line ray, the second line ray would appear across the hood, width-wise. As the driver nears the proper parking location, the second line ray will approach the windshield. Once the second line ray intersects the predetermined indicator, the driver can be assured the vehicle is properly within, e.g., centered lengthwise, in the garage.

The combination of these two line rays provides a vehicle positioning device that guides the driver of the vehicle into a proper position both width-wise and length-wise.

BRIEF DESCRIPTION OF THE DRAWINGS

An embodiment of the invention will be described in conjunction with drawings of which.

DETAILED DESCRIPTION OF THE PREFERRED EMBODIMENT OF THE INVENTION

Figure 1:
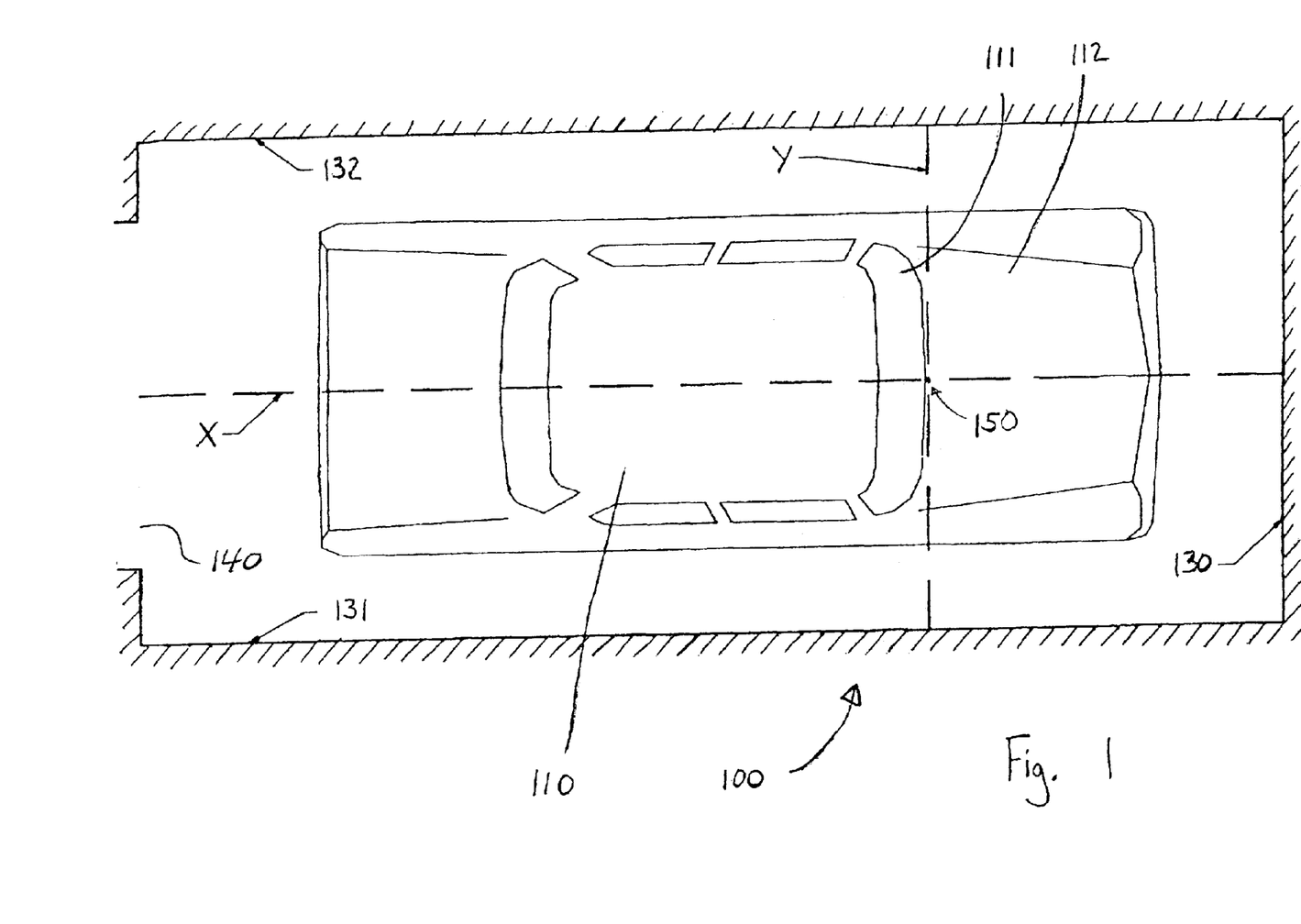
FIG. 1 is a top view of a garage illustrating the method according to an embodiment of the invention.

Referring to FIG. 1, there is shown a top view of a typical garage 100 with a vehicle 110 parked therein. The garage 100 comprises a forward wall 130 and two side walls 131 and 132. At the side opposite of the forward wall 130 is the garage door opening 140. The garage door opening 140 would typically have a garage door which opens and closes to allow access to the garage, however, such is not shown here for simplicity.

Vehicle 110 shown here is for example shown in an optimal position in garage 100. Vehicle 110 is centrally parked within garage 100 to allow for movement between the vehicle and the garage walls 130, 131 and 132. A spot 150 is chosen on the vehicle 110 which will be used as the predetermined indicator when parking the vehicle in garage 100. Spot 150 in this embodiment is positioned on the center width-wise of the vehicle and at the intersection between the hood 112 and windshield 111 of the vehicle. Spot 150 may need not be at this location, but may be at any location which can be used to correctly position vehicle 10 using this invention.

From the position of spot 150, a pair of location axes can be created. An x-axis X extends down the center (also known as a centerline) for the length of garage 100 and intersects spot 150. A y-axis Y extends at an angle to x-axis X bisecting garage 100, also intersecting spot 150. In this embodiment y-axis Y intersects x-axis X at a right angle, but other angles are possible.

As a driver pulls vehicle 110 into garage 100, when the spot 150 is aligned with the intersection of the x and y axes, X and Y, the vehicle will be in the optimal location within the garage.

Figure 2:
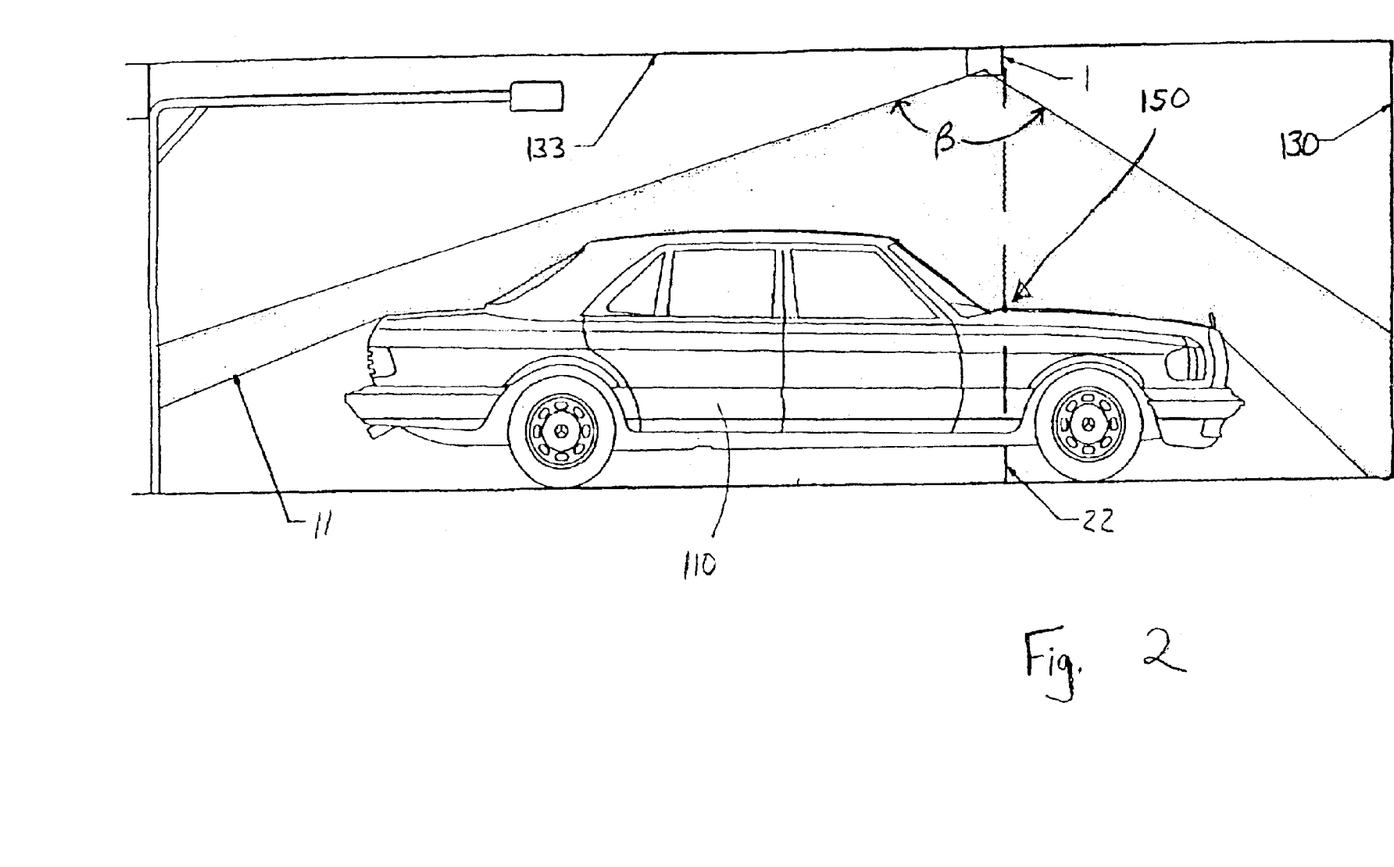
FIG. 2 is a side view of the garage shown in FIG. 1.
Figure 3:
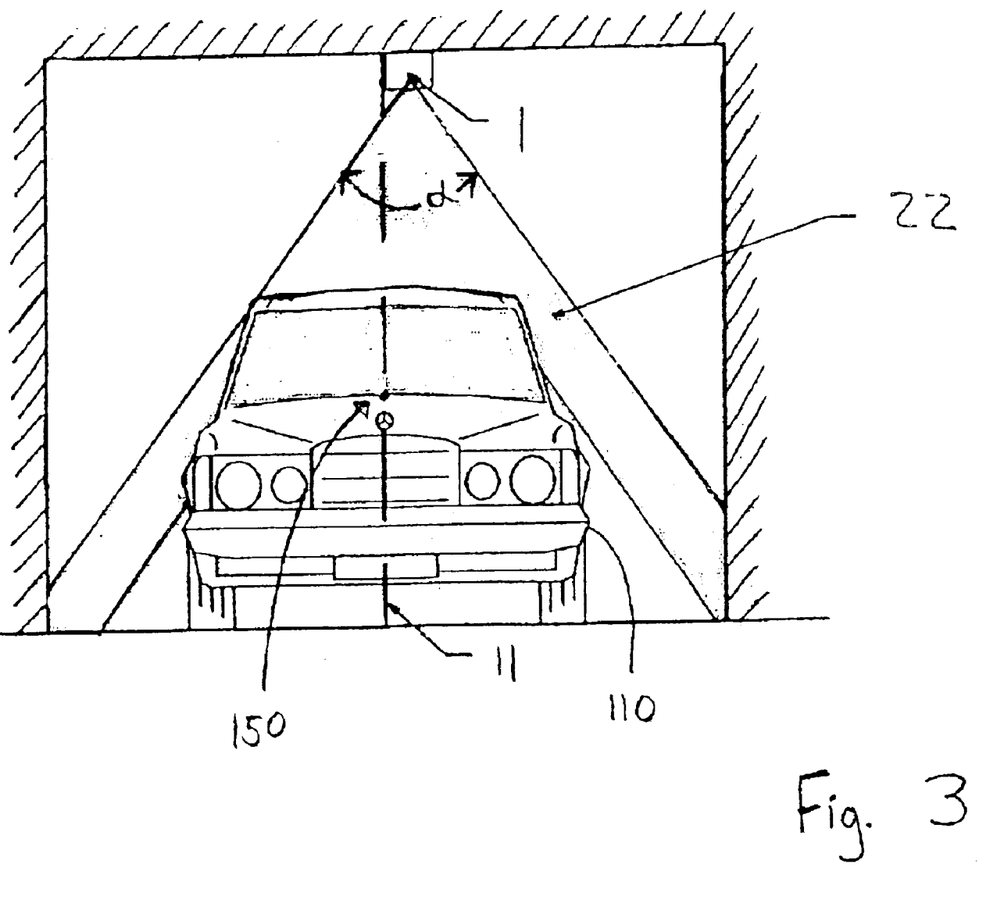
FIG. 3 is a front view of the garage shown in FIG. 1.

FIGS. 2 and 3 show how this embodiment of the invention guides the driver of vehicle 110 into the proper location within garage 100. A guide device 1 is attached to the garage 100 at a location above the vehicle 110, which may be on the ceiling 133, either side wall 131 or 132 or even the forward wall 130. The guide device 1 is a light-emitting device that emits a pair of line rays. A first line ray 11 is projected down along the x-axis X in garage 100. The shaded area in FIG. 2 represents the projection of line ray 11 emitted by guide device 1. A second line ray 22 is projected along the y-axis Y in garage 100. The shaded area in FIG. 3 represents the projection of line ray 22 emitted by guide device 1.

The combination of both of the line rays 11 and 22 has the effect of projecting a cross pattern in garage 100 along the floor and the walls. If an object were to move into the line rays, the line rays would shine on the object. Thus, when vehicle 110 is moved into garage 100, the line rays would create a cross pattern along the top, hood, windshield, etc. of the vehicle. When the cross pattern is used in conjunction with spot 150, the driver is guided into the optimal position.

The guide device 1 must be calibrated before effective use. First, vehicle 110 is placed into the optimal position within garage 100. Such may be done by visually checking the position or by any other means to place the vehicle in the precise position where the driver of the vehicle will always desire the vehicle to be parked. Once in this position, guide device 1 must be activated to turn on line rays 111 and 22. These line rays should be arranged so that their intersection coincides with spot 150 on vehicle 110 and their projections coincide with their respective axes, X or Y, as mentioned above. Once these alignments are made, the guide device 1 is calibrated and ready for use.

The use of the guide device 1 in conjunction with garage 100 and vehicle 110 having spot 150 will now be described with reference to FIGS. 1, 2 and 3. As the vehicle begins to enter the garage for parking, the guide device 1 projects line ray 11 along the x-axis X. Such line ray 11 will be projected onto the hood of the vehicle 110. As the vehicle moves within the garage, the driver notes the spot 150 position with respect to line ray 11 on the hood. The driver can then turn the vehicle left or right as needed to align spot 150 on the vehicle 110 with line ray 11. Once the spot 150 is aligned with line ray 11, as shown in FIG. 3, the driver is assured the vehicle 110 is proceeding directly towards the optimal spot in the garage.

Simultaneously, the guide device 1 is projecting line ray 22 perpendicular to the movement of the vehicle 110 along line ray 11. As the driver nears the optimal position, he or she will note line ray 22 being projected on the hood of the vehicle 110 and moving toward spot 150. Once line ray 22 intersects spot 150, the driver is located in the optimal position and should stop the vehicle 110. The combination of the two line rays 11, 22 guides the driver through the garage 100 and indicates when to stop, which provides a simple and effective method to properly located the vehicle 110 into the optimal position in the garage 100.

Figure 4:
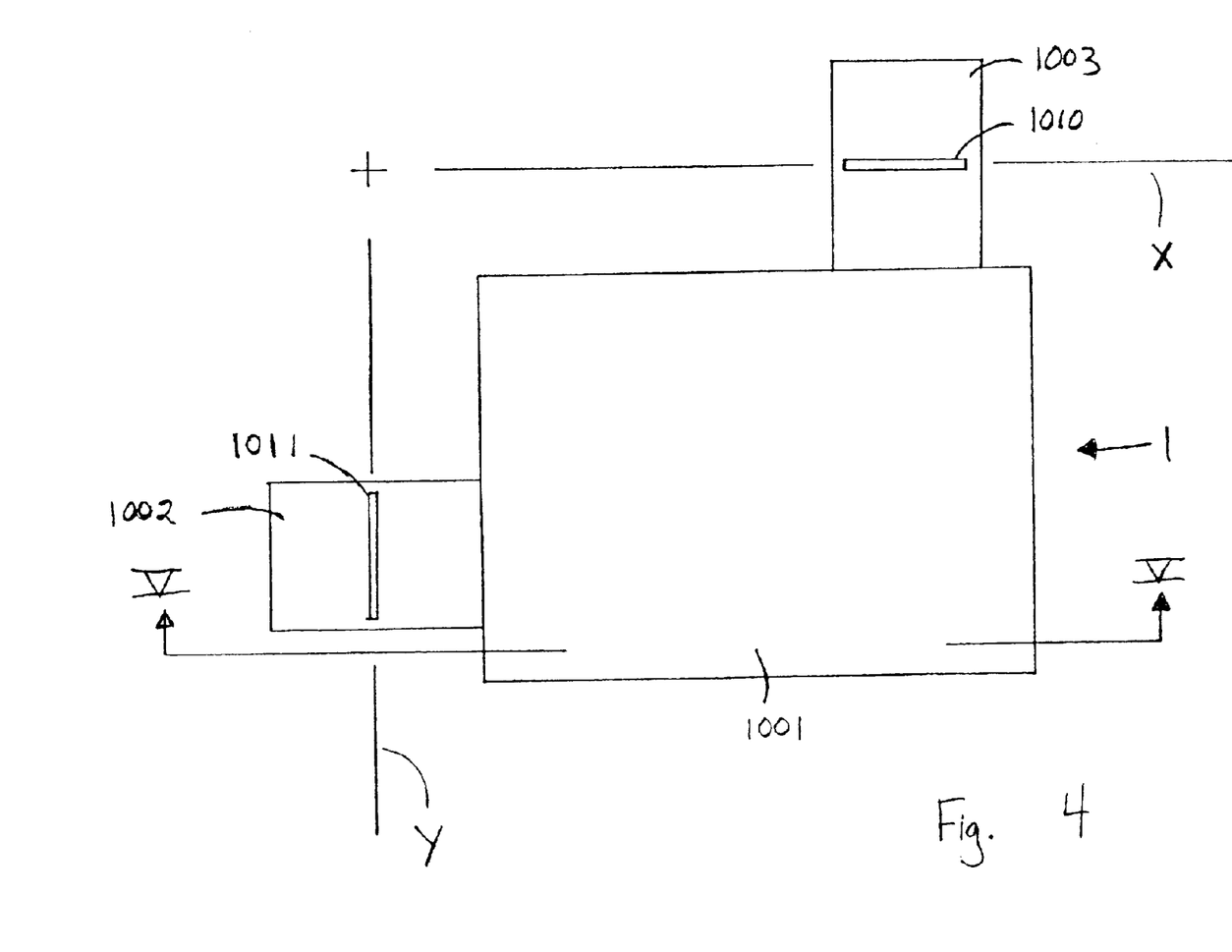
FIG. 4 is a bottom view the laser guide device.

A general construction of a guide device 1 (light emitting device) according to the invention will now be described with reference to FIGS. 4, 5 and 6. Guide device 1 generally comprises a box 1001 with two rotating lasers 1002 and 1003 extending therefrom wherein the line rays are generated. The first rotating laser 1002 has a light slit 1011 from which projects light ray 22 along they-axis Y. The second rotating laser 1003 has a slit 1010 which projects light ray 11 along the x-axis X.

Figure 5:
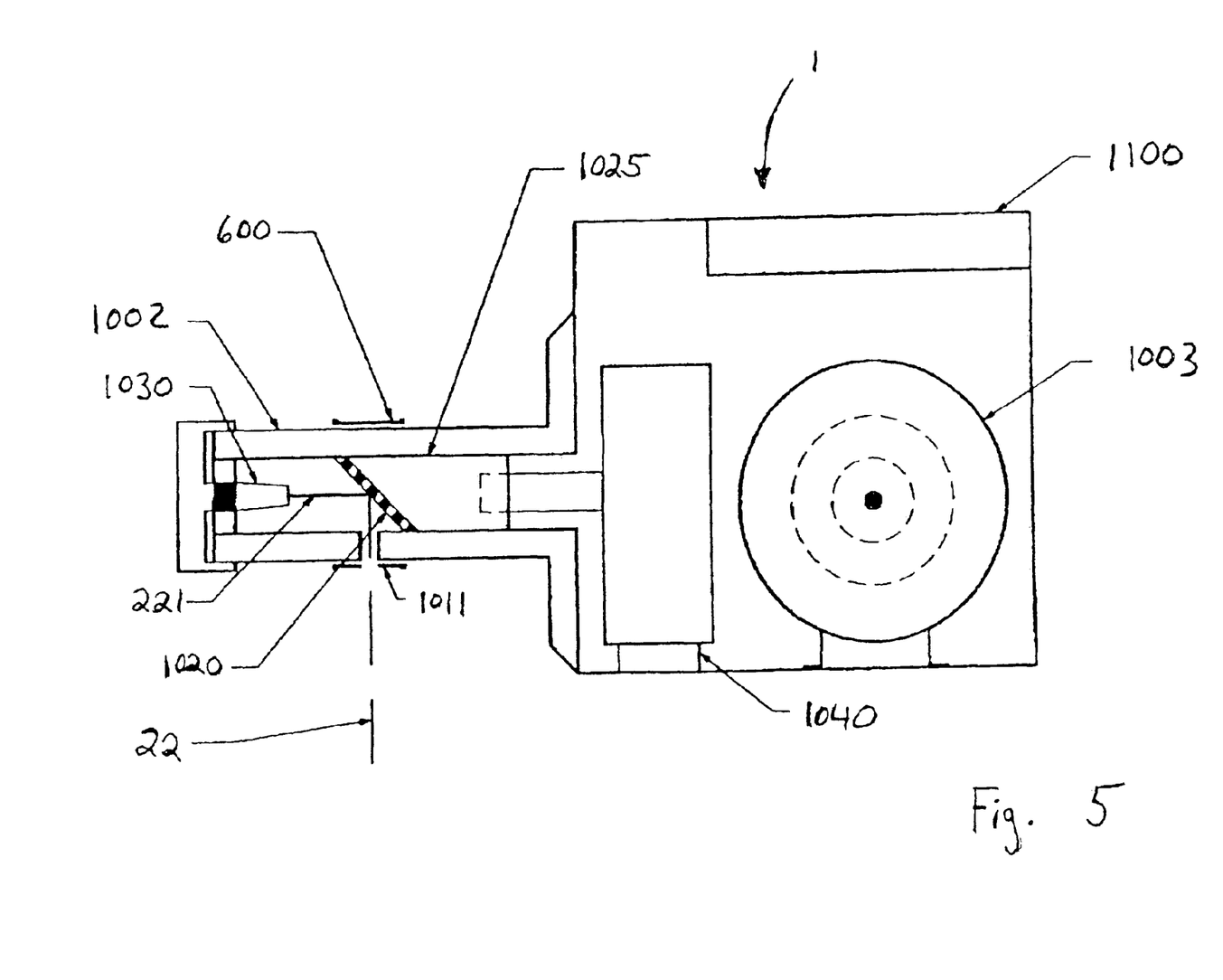
FIG. 5 is a cut away view of the laser guide device shown in FIG. 4 along line V—V.
Figure 6:
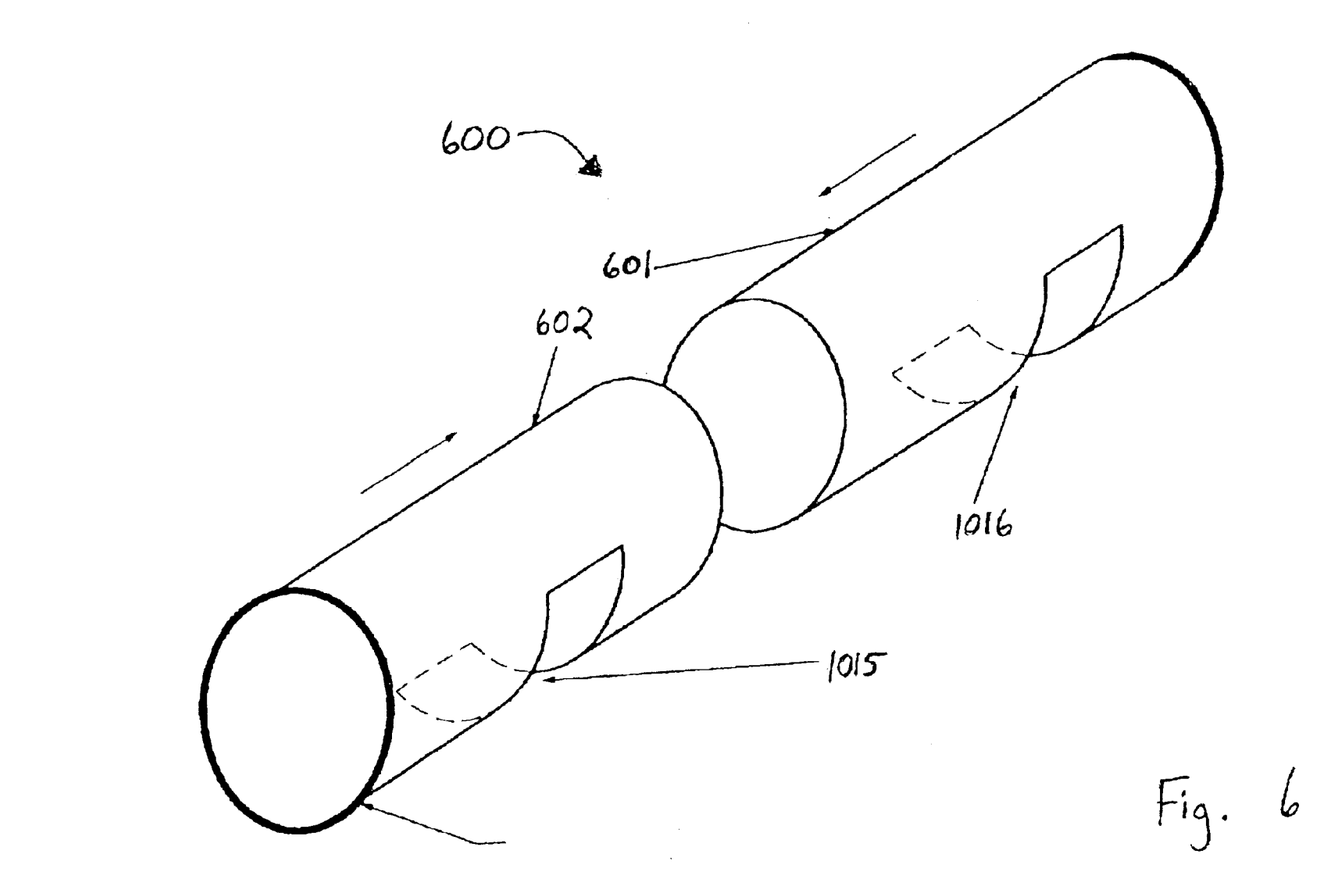
FIG. 6 is an illustration of the tubes for adjusting the throw of light.

A more detailed view of rotating laser 1002 is shown in FIG. 5. A laser 1030 is situated near an end of the rotating laser 1002. Laser 1030 projects a beam 221 into a spinning mirror 1020, which rotates in conjunction with a carriage bearing 1025. The carriage bearing is operatively connected to a motor 1040, which causes the spinning mirror 1020 to rotate rapidly. The mirror is spun sufficiently fast to change the appearance of beam 221 into a circular line ray moving away from guide device 1. The line ray is projected 360 degrees from the spinning mirror 1020. The spun beam 221 appears as a line onto whatever object it shines upon. The structure and operation of rotating laser 1003 is congruent with that of rotating laser 1002.

The rotating lasers 1002 and 1003 each also have a pair of guard tubes for blocking parts of the circular line rays. For example, guard tube 600 comprises a pair of tubes 601 and 602 that fit telescopically over each other. Each tube has a respective light slit 1015 and 1016 located centrally therein and extending around a circumference of the tube. Tube 601 slides over tube 601 and the slits 1015 and 1016 are aligned to form slit 1011 for allowing light to pass from inside the tubes. Guard tube 600 with the individual tubes 601 and 601 assembled together is then placed over the rotating laser 1002. As the tubes 601 and 602 are rotated about their circumference with respect to each other, the circumferential width of slit 1011 is increased or decreased along with such rotation. Guard tube 600 is designed to cut off part of the circular line ray to form more of an are line ray. This prevents the guide device from projecting the line rays to undesired locations, such as the ceiling, to a place where they could shine in the driver's eyes, or any other undesired location. Such is shown in FIG. 3 where the line ray 22 is cut down to a ray extending sweeping out at an angle α of about 80 degrees, or projecting only enough line ray to cover the hood of vehicle 110 and a little outside on each side of the vehicle. Typical arcs for line ray 22 sweep across an arc for an angle α of about 10° to about 90°. As shown in FIG. 2, line ray 11 is cut down to an angle β of about 135 degrees to shine down part of the driveway (not shown but located outside the garage), through the garage 100 and onto forward wall 130. Typical arcs for line ray 11 sweep across an arc for an angle β of about 140° to about 90°. However, if desired angle β may range from about 90° to about 45°. If desired the ray is directed from a starting point of from 0° to about 5°, e.g. about 3° to about 5° downstream of a downward imaginary line perpendicular to the guide device 1 to further downstream of the guide device 1. The tubes 601 and 602 can also be telescoped with respect to each other in order to narrow the width of the slit 1011. This has the advantage of reducing the width of the line ray to create a more defined line ray for alignment with spot 150.

The guide device 1 may be operated as a stand-alone unit, operated via batteries or using a standard outlet in conjunction with a transformer. It may be turned on by a remote device or via a switch located within the garage. Such activation devices are well known to those having ordinary skill in the art and will not be discussed herein.

Figure 7:
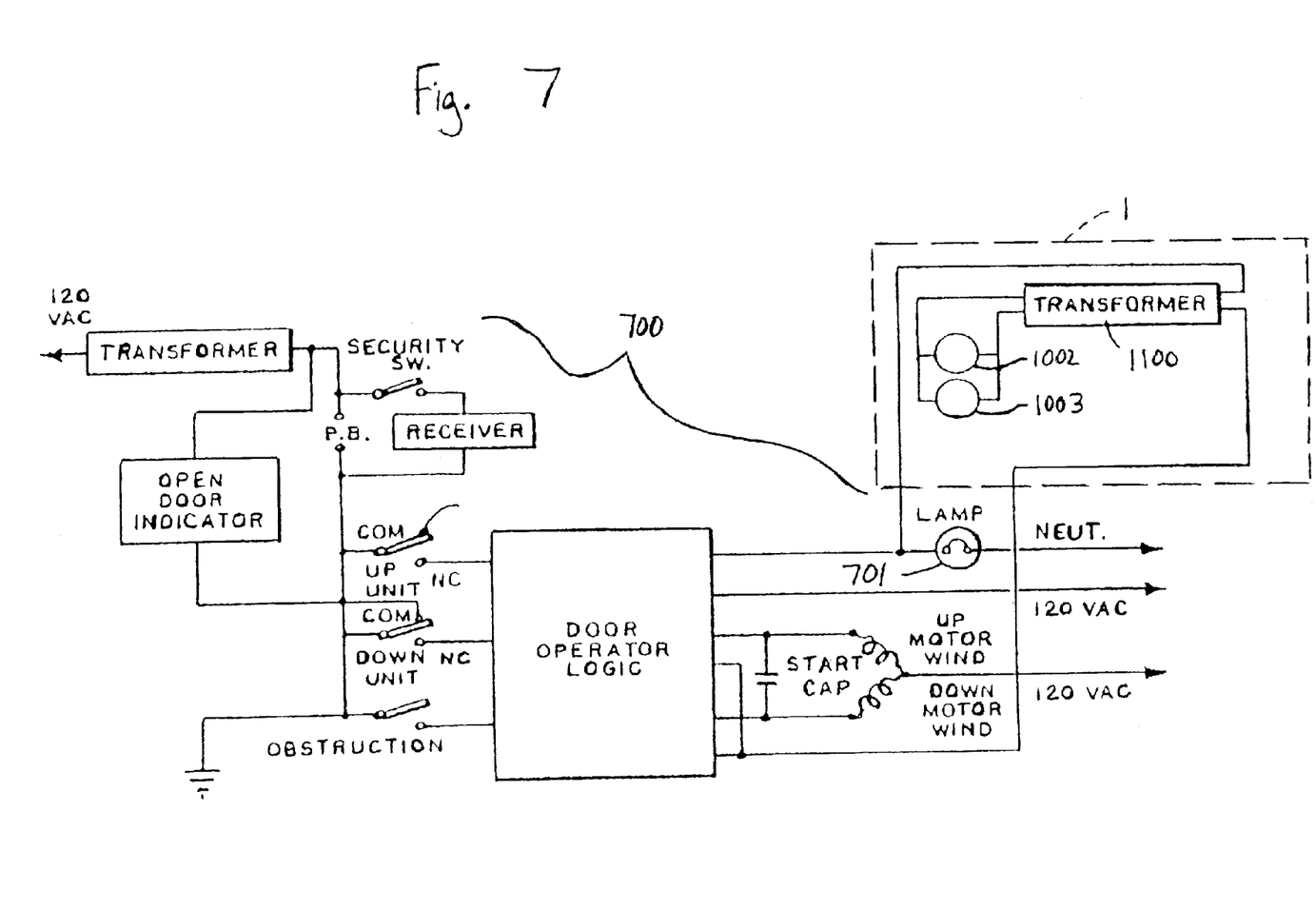
FIG. 7 is a schematic diagram of the guide device associated with a conventional garage door opener.

The guide device may also be used in conjunction with a garage door opener. FIG. 7 shows typical circuitry for this. In FIG. 7, the guide device 1 is electrically connected to the garage door opener 700 by a parallel circuit around a lamp 701 used to light the garage when the garage door opener is activated. A transformer 1100 is arranged in series with the rotating lasers 1002 and 1003 which are arranged in parallel between themselves to supply the proper power to the rotating lasers. The remaining portions of the garage door opener disclosed are well known and will not be described herein.

Lamp 701 provides light in the garage while the driver parks the vehicle and is activated upon opening of the garage door. Following the closing of the garage door, the lamp automatically turns off following a predetermined time or is manually turned off by the driver exiting the garage. When the guide device 1 is connected in parallel to the lamp, it will be turned on and off in the same circumstances and at the same time as the lamp. In an embodiment not shown, if desired, the rotating lasers 1002 and 1003 can be on a separate circuit from the lamp 701 and the door operator logic can be set to turn the lasers 1002 and 1003 off before turning off the lamp 701.

Although the present invention has been described and illustrated in detail, such explanation is to be clearly understood that the same is by way of illustration and example only, and is not to be taken by way of limitation. For example, the guide device need not specifically be use in conjunction with a garage, but can be used in other places where a vehicle need to be parked in a certain designated position. Also, a car was used in the illustrations for the vehicle, but other vehicles, e.g., trucks, semis, may be used. Further, while rotating lasers were disclosed as the light projection source, other light sources may be used, such as a normal light passed through slit arrays, spinning pen lights, etc. The spirit and scope of the present invention should be limited only by the terms of the claims.

I claim:

1. A method for moving a vehicle into a predetermined location, comprising the steps of:
   projecting a first linear beam of light in the vicinity of the predetermined location;
   projecting a second linear beam of light at an angle to and intersecting the first linear beam of light; and
   moving the vehicle into the vicinity of the predetermined location along a path relative to the first linear beam of light until an indicator on the vehicle coincides with the intersection of the first and second linear beams of light;
   wherein rotating lasers having guard tubes project the first and second linear beams;
   wherein guard tubes placed on each of the rotating lasers reduce a throw pattern of each of the first and second linear beams of lights respectively.

2. The method according to claim 1, wherein the predetermined location is in a garage.

3. The method according to claim 2, comprising the step of:
   projecting the first and second linear beams when a garage door of the garage opens to allow a vehicle to enter.

4. The method according to claim 2, including comprising the step of:
   projecting the first and second linear beams concurrently with an activation of an overhead light of a garage door opener.

5. The method according to claim 1, including comprising the step of:
   projecting the first linear beam of light along a centerline centered in of the predetermined location and aligned with a direction of moving the vehicle into the predetermined location.

6. The method according to claim 5, comprising the step of:
   projecting the second linear beam of light along a line perpendicular to the centerline.

7. The method according to claim 1, wherein a pair of rotating lasers project the first and second linear beams of light.

8. The method according to claim 7, wherein the first linear beam sweeps across an arc of about 140° to about 90° and the second linear beam sweeps across an arc of about 100 to about 90°.

9. The method according to claim 1, wherein the first linear beam sweeps across an arc of about 140° to about 90° and the second linear beam sweeps across an arc of about 10° to about 90°.

10. The system according to claim 1, wherein the first linear beam sweeps across an arc of about 45° to 90° starting from 0° to about 5° downstream of an imaginary line perpendicular to the first means for projecting said first linear beam of light and ending further downstream of said imaginary line and the second linear beam sweeps across an arc about 10° to about 90°.

11. A system for moving a vehicle into a predetermined location, comprising:
    an indicator on the vehicle;
    a first rotating laser for projecting a first linear beam of light onto the vehicle when the vehicle enters the vicinity of the predetermined location; and
    a second rotating laser for projecting a second linear beam of light at an angle to and intersecting with the first linear beam;
    wherein the indicator coinciding with the first linear beam provides a guide for the vehicle to travel in a direction along the first linear beam and when the indicator coincides with the intersection between the first and second beams, the vehicle is in the predetermined location;
    wherein guard tubes are paced on each of the first and second means for projecting for reducing a throw pattern of each of the first and second linear beams of light, respectively.

12. The system according to claim 11, wherein the predetermined location is within a parking space.

13. The system according to claim 12, wherein the first and second means for projecting rotating lasers are electronically connected to a garage door opener.

14. The system according to claim 12, wherein the parking space is in a garage.

15. The system according to claim 14 wherein the first linear beam is projected along a portion of the floor and up a back wall of the garage.

16. The system according to claim 15, wherein the first linear beam is projected along a centerline centered in of the parking space in the garage.

17. The system according to claim 11, wherein the angle between the first and second linear beams is 90°.

18. The system according to claim 11, wherein the first and second rotating lasers are part of a unit mounted above the predetermined location.

19. The system according to claim 18, wherein the unit is a garage door opener.

20. The system according to claim 19, wherein the first and second rotating lasers operate concurrently with the operation of an overhead light in the garage door opener.

21. The system according to claim 11, wherein the first linear beam sweeps across an arc of about 140° to about 90° and the second linear beam sweeps across an arc of about 10° to about 90°.

22. The system according to claim 11, wherein the first linear beam sweeps across an arc of about 45° to 90° starting from 0° to about 5° downstream of an imaginary line perpendicular to the first means for projecting said first linear beam of light and ending further downstream of said imaginary line and the second linear beam sweeps across an arc about 10° to about 90°.

* * * * *